US009367480B2

(12) United States Patent
Peterson et al.

(10) Patent No.: US 9,367,480 B2
(45) Date of Patent: Jun. 14, 2016

(54) SYSTEM AND METHOD FOR UPDATING DATA IN A CACHE

(75) Inventors: Scott David Peterson, Beaverton, OR (US); Christopher August Shaffer, Portland, OR (US); Phillip E. Krueger, Portland, OR (US)

(73) Assignee: Dell Products L.P., Round Rock, TX (US)

( * ) Notice: Subject to any disclaimer, the term of this patent is extended or adjusted under 35 U.S.C. 154(b) by 533 days.

(21) Appl. No.: 13/568,564

(22) Filed: Aug. 7, 2012

(65) Prior Publication Data

US 2014/0047181 A1   Feb. 13, 2014

(51) Int. Cl.
*G06F 12/00*   (2006.01)
*G06F 12/12*   (2016.01)
*G06F 12/08*   (2016.01)

(52) U.S. Cl.
CPC .......... *G06F 12/121* (2013.01); *G06F 12/0873* (2013.01); *G06F 2212/1016* (2013.01); *G06F 2212/284* (2013.01)

(58) Field of Classification Search
USPC ........................................................ 711/118
See application file for complete search history.

(56) References Cited

U.S. PATENT DOCUMENTS

| 5,524,212 | A | 6/1996 | Somani et al. ................ 711/121 |
| 5,537,574 | A | 7/1996 | Elko et al. ..................... 711/141 |
| 5,845,325 | A | 12/1998 | Loo et al. |
| 5,895,485 | A | 4/1999 | Loechel et al. |
| 5,909,540 | A | 6/1999 | Carter et al. ................... 714/4.4 |
| 5,933,848 | A * | 8/1999 | Moenne-Loccoz ........... 711/113 |
| 6,260,068 | B1 | 7/2001 | Zalewski et al. ............... 709/226 |
| 6,363,411 | B1 | 3/2002 | Dugan et al. ................... 709/202 |
| 6,594,698 | B1 | 7/2003 | Chow et al. .................... 709/226 |
| 7,089,366 | B2 | 8/2006 | Horrigan et al. .............. 711/135 |
| 8,041,735 | B1 | 10/2011 | Lacapra et al. ................ 707/783 |
| 8,311,032 | B2 | 11/2012 | Smith et al. .................... 370/351 |
| 8,396,936 | B2 | 3/2013 | Li et al. .......................... 709/213 |
| 8,533,393 | B1 | 9/2013 | Cote et al. ...................... 711/118 |
| 2003/0196040 | A1 | 10/2003 | Hosogi et al. .................. 711/128 |
| 2003/0233347 | A1* | 12/2003 | Weinberg et al. ................. 707/3 |
| 2004/0133741 | A1 | 7/2004 | Kuwata .......................... 711/113 |
| 2006/0248285 | A1 | 11/2006 | Petev ............................. 711/141 |
| 2009/0077312 | A1 | 3/2009 | Miura ............................ 711/113 |
| 2009/0144388 | A1 | 6/2009 | Gross et al. .................... 709/213 |
| 2009/0150511 | A1 | 6/2009 | Gross et al. .................... 709/213 |
| 2009/0193122 | A1 | 7/2009 | Krishamurthy ............... 709/226 |
| 2009/0307686 | A1 | 12/2009 | Hepkin ........................ 718/149 |

(Continued)

OTHER PUBLICATIONS

Non-Final Office Action issued in U.S. Appl. No. 13/568,921; 12 pages, Jun. 19, 2015.

(Continued)

*Primary Examiner* — Jared Rutz
*Assistant Examiner* — Hamdy S Ahmed
(74) *Attorney, Agent, or Firm* — Baker Botts L.L.P.

(57) ABSTRACT

In one embodiment, a computing system includes a cache having one or more memories and a cache manager. The cache manager is able to receive a request to write data to a first portion of the cache, write the data to the first portion of the cache, update a first map corresponding to the first portion of the cache, receive a request to read data from the first portion of the cache, read from a storage communicatively linked to the computing system data according to the first map, and update a second map corresponding to the first portion of the cache. The cache manager may also be able to write data to the storage according to the first map.

14 Claims, 6 Drawing Sheets

(56) References Cited

U.S. PATENT DOCUMENTS

| | | | |
|---|---|---|---|
| 2010/0023674 A1 | 1/2010 | Aviles | 711/103 |
| 2010/0083247 A1 | 4/2010 | Kanevsky et al. | 718/1 |
| 2010/0299553 A1 | 11/2010 | Cen | 714/4 |
| 2011/0131379 A1 | 6/2011 | Jain et al. | |
| 2011/0270899 A1 | 11/2011 | Chen et al. | 707/816 |
| 2012/0144128 A1 | 6/2012 | Serebrin et al. | 711/149 |
| 2012/0215970 A1 | 8/2012 | Shats | 711/103 |
| 2013/0042056 A1 | 2/2013 | Shats et al. | 711/103 |
| 2013/0326150 A1 | 12/2013 | Phelan et al. | 711/135 |
| 2014/0047062 A1 | 2/2014 | Krueger et al. | 709/216 |
| 2014/0047183 A1 | 2/2014 | Chawla et al. | 711/119 |
| 2014/0047185 A1 | 2/2014 | Peterson et al. | 711/123 |
| 2014/0047190 A1 | 2/2014 | Dawkins et al. | 711/136 |
| 2014/0047193 A1 | 2/2014 | Gross et al. | 711/144 |

OTHER PUBLICATIONS

Non-Final Office Action issued in U.S. Appl. No. 13/568,850; 13 pages.

Makatos et al., "Using Transparent Compression to improve SSD-based I/O Caches" EuroSys'10, 14 pages, Apr. 13, 2010.

Nitzberg et al., "Distrubted Shared Memory: A Survey of Issues and Algorithms", Computer (Aug. 1991), pp. 52-60, Aug. 1, 1991.

Khan, "Distrubuted Cachin on the Path to Scalability", MSDN Magazine, 8 pages, Jul. 1, 2009.

Chadalapaka et al., "A Study of iSCSI Extensions for RDMA (iSER)", ACM ASIGCOMM 2003 Workshop, pp. 209-219, Aug. 1, 2003.

Non-Final Office Action issued in U.S. Appl. No. 13/568,795; 13 pages, Aug. 18, 2014.

Final Office Action issued in U.S. Appl. No. 13/568,795; 15 pages, Mar. 5, 2015.

Non-Final Office Action issued in U.S. Appl. No. 13/568,921; 9 pages, Jan. 29, 2014.

Final Office Action issued in U.S. Appl. No. 13/568,921; 10 pages, Aug. 27, 2014.

Final Office Action issued in U.S. Appl. No. 13/568,991; 12 pages, Jan. 6, 2015.

Non-Final Office Action issued in U.S. Appl. No. 13/568,991; 9 pages, Jul. 18, 2014.

Non-Final Office Action issued in U.S. Appl. No. 13/568,991; 9 pages, Feb. 26, 2014.

Non-Final Office Action issued in U.S. Appl. No. 13/568,951; 11 pages, Mar. 26, 2015.

Final Office Action issued in U.S. Appl. No. 13/568,951; 12 pages, Aug. 15, 2014.

Non-Final Office Action issued in U.S. Appl. No. 13/568,951; 12 pages, Mar. 10, 2014.

Non-Final Office Action issued in U.S. Appl. No. 13/568,850; 11 pages, Feb. 13, 2014.

Final Office Action issued in U.S. Appl. No. 13/568,850; 12 pages, Oct. 21, 2014.

* cited by examiner

SYSTEM AND METHOD FOR UPDATING DATA IN A CACHE

TECHNICAL FIELD

This disclosure generally relates to a network with distributed shared memory.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a computer network connection. In particular, certain information handling systems may be designed to monitor, configure, and adjust the features, functionality, and software of other information handling systems by communicating with those information handling systems over a network connection. For example, one information handling system might be configured to manage a shared, distributed cache.

DESCRIPTION OF EXAMPLE EMBODIMENTS

Figure 1:
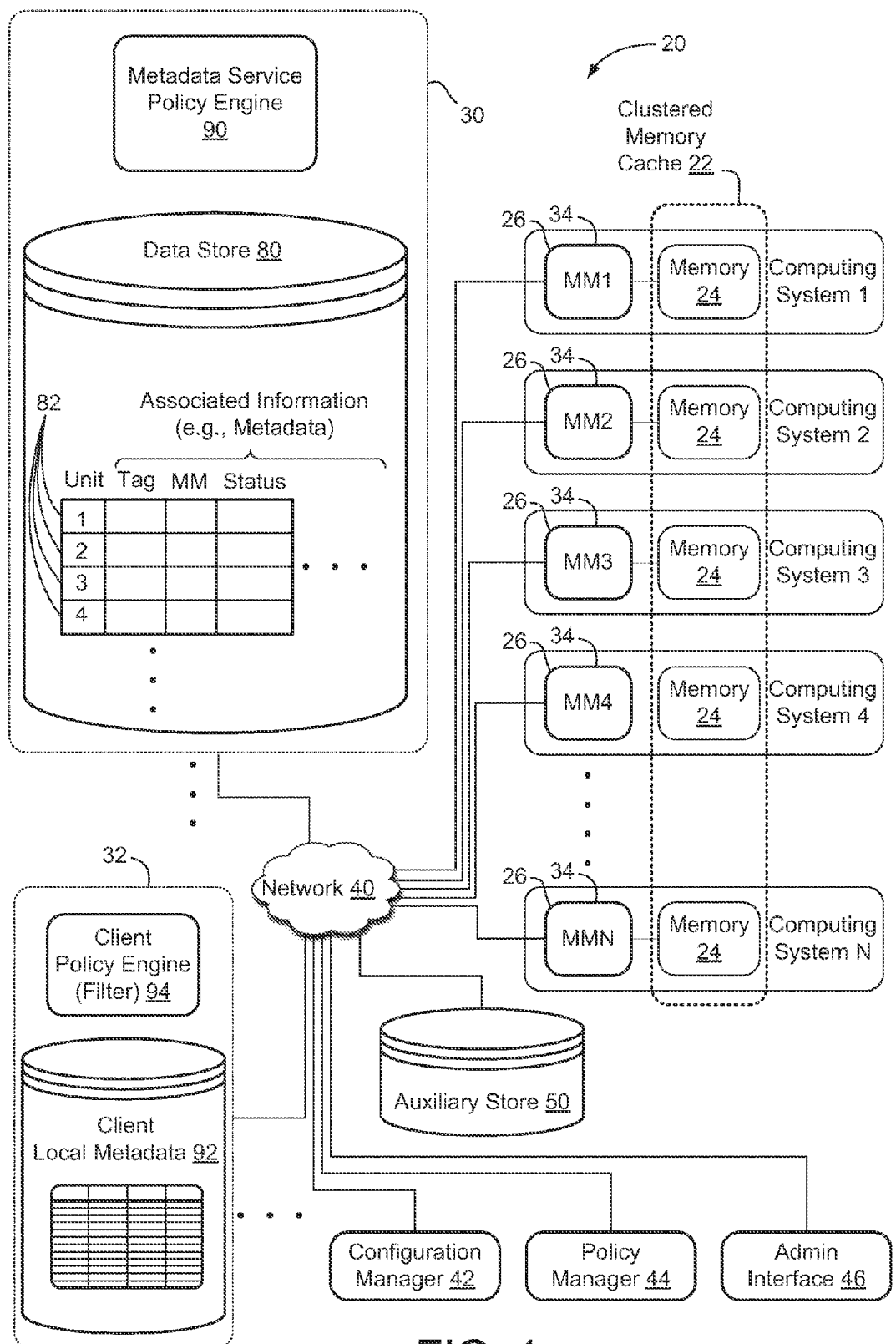
FIG. 1 schematically depicts an example network with distributed shared memory.

FIG. 1 depicts an example computer network 20 with distributed memory. The memory resource and supporting systems may be configured in a variety of different ways and for different applications. Caching is one example of a use of computer network 20. Accordingly, the distributed memory resource in the example of FIG. 1, and in other examples discussed herein, includes a clustered memory cache 22. Referring specifically to FIG. 1, clustered memory cache 22 may be aggregated from and comprised of physical memory locations 24 on a plurality of physically distinct computing systems 26 (individually designated as Computing System 1, Computing System 2, etc.) and associated local memory managers 34 (individually designated as MM1, MM2, etc.). In particular embodiments, physical memory 24 may include one or more solid state devices (SSDs) including, for example, one or more SSDs compliant with a standard such as the Peripheral Component Interconnect Express (PCIe) standard. Physical memory 24 may include persistent or non-volatile memory devices 24 including, for example, flash and magnetic disk. In particular embodiments, each type of physical memory 24 (e.g., RAM, flash, magnetic disk) on a computing system 26 may have its own local memory manager 34. Additionally, physical memory 24 may have hot plug capabilities, such that physical memory 24 may be inserted into, removed from, or swapped between computing systems 26 without the need for pausing the operation of computer network 20 or clustered cache 22. Computer network 20 also includes a metadata service 30, a plurality of clients 32 (only one of which is shown in the example embodiment of FIG. 1), and, as described above, a plurality of local memory managers 34 (individually designated as MM1, MM2, etc.). In particular embodiments, metadata service 30 may be located on one or more computing systems 26. Each of the local memory managers 34 is local to and associated with a different portion of clustered memory cache 22. The metadata service, clients and local memory managers are all operatively coupled with each other via network 40. In addition, one or more configuration managers 42 (only one is shown in the example of FIG. 1), a policy manager 44, and an admin interface 46 may also be provided as part of computer network 20 (and may, in particular embodiments, be operatively coupled to other elements via network 40), to provide various functions that will be described below. In particular embodiments, configuration manager 42 may be located on one or more computing systems 26. Computer network 20 includes an auxiliary store 50 which may also be coupled to other elements in computer network 20 via network 40. Auxiliary store 50 may include one or more storage devices or systems at various locations (local or remote), including but not limited to hard disks, file servers, disk arrays, storage area networks, and the like. Auxiliary store 50 may, in particular embodiments, include DAS backing devices (used by a particular computing system 26), SAN backing devices (shared among computing systems 26), or a combination of the two.

Clustered memory cache 22 provides a shared memory resource that can be accessed and used by the clients.

Depending on the mode of operation, clients 32 can read from and write to the clustered memory cache and cause insertion and/or eviction of data items to/from the cache.

As used herein, "client" may broadly to refer to any hardware or software entity that makes use of the shared memory resource. For example, clients may include personal computers, workstations, servers and/or applications or other software running on such devices.

"Client" may also more specifically refer to a driver or other software entity that facilitates access to the shared memory resource. For example, as will be described in more detail, a driver can be loaded into memory of a networked computer, allowing applications and the operating system of that computer to recognize or make use of the clustered cache.

The distributed shared memory described herein may be operated in a variety of modes. Many of the examples discussed herein will refer to a mode where clustered memory cache 22 provides caching functionality for data used by clients 32. In particular, data items read from an auxiliary store 50 may be cached in clustered memory cache 22, and data items to be written to auxiliary store 50 may also be cached in clustered memory cache 22. Thus, even though a particular client may have ready access to the auxiliary store (e.g., access to a file system stored on a hard disk), it may be desirable to place requested data in the clustered memory cache, so as to provide faster access to the data.

Local Memory Managers

Regardless of the particular mode of operation, the clustered memory cache may span multiple physically distinct computing systems. For example, in FIG. 1, clustered memory cache 22 includes memory from N different computing systems 26 (Computing System 1, Computing System 2, etc., through Computing System N). The individual computing systems can be of varying configurations, for example ranging from relatively low-powered personal devices to workstations to high-performance servers. SMP or other multiprocessor architectures may be employed as well, in which one or more of the computing systems employ multiple processors or cores interconnected via a multiprocessor bus or other interconnect. As described in detail herein, physical memory 24 from these physically distinct systems 26 may be aggregated via network 40 and made available to clients 32 as a unified logical resource.

Referring particularly to local memory managers 34, each memory manager may be local to and associated with a different portion of clustered memory cache 22. The memory managers typically are independent of one another, and each is configured to allocate and manage individual units of physical memory in its associated portion of clustered memory cache 22.

The local memory managers can be configured to manage client references and access to cached data items. As an illustration, assume a particular client 32 needs access to a data item cached in the portion of clustered cache 22 that is managed by memory manager MM1. The client may query metadata service 30 to identify which local memory manager 34 (in this case, MM1) manages the desired cached data item, as described in further detail below. Once the client knows the memory location for the cached item is managed by MM1, the client contacts MM1 via network 40 to gain access to the cached item. If access is permitted, the memory manager MM1 grants access and maintains a record of the fact that the requesting client has a reference to the memory location. The record may indicate, for example, that the client has a read lock on a particular block of memory that is managed by memory manager MM1.

In some embodiments, clustered memory cache 22 may be implemented using Remote Direct Memory Access (RDMA). RDMA implementations that may be employed include, but are not limited to, the Virtual Interface Architecture, InfiniBand, RDMA over Converged Ethernet (RoCE), RDMA over TCP/IP, and iWARP. In such a setting, the local memory manager may be configured to provide RDMA keys to requesting clients or otherwise manage the respective access controls of the RDMA implementation.

For any given memory manager, the associated portion of the clustered cache will often include many different blocks or other units of memory. In particular, referring to FIG. 2, an exemplary memory manager 34 is depicted, including a cache store 60. In the depicted example, cache store 60 is schematically represented as a table, with a record (row entry) for each block or other unit of physical memory managed by the memory manager. In particular embodiments of clustered cache 22 having cache data replication functionality, one cache store 60 may be created in memory manager 34 for non-replica portions of clustered cache 22 managed by memory manger 34. Separate cache stores 60 may be created in memory manager 34 for each replica store managed by memory manger 34. The first column in the example is simply an index, tag or other identifier used to designate a particular block of memory.

Figure 2:
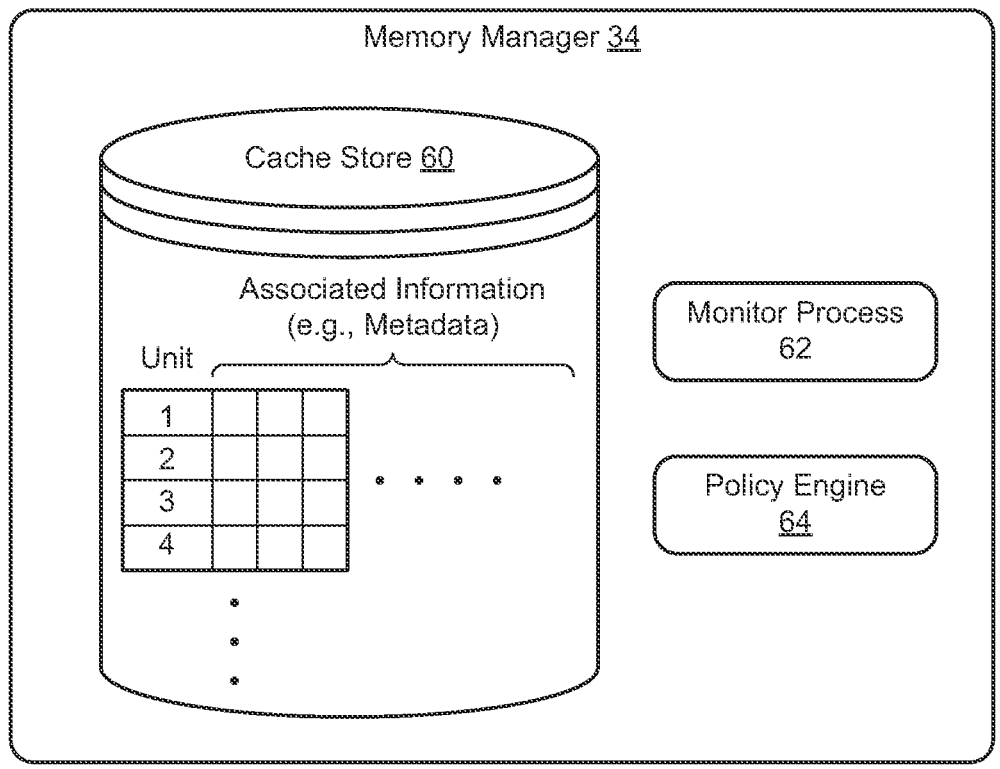
FIG. 2 schematically depicts an example memory manager.

The remaining column or columns may contain metadata or other information associated with the corresponding unit of memory and/or the data stored in that unit of memory. As depicted in FIG. 2, memory manager 34 may also include a monitor thread 62 to facilitate the acquisition and updating of the cache store information. The associated information may include, by way of example, information about read locks, write locks and/or other client references to the unit of memory; a filename/path hash or other mechanism for identifying the cached data item(s); status indicators; rates of eviction and insertion; temporal information such as time resident in the cache, time since last access, etc.; block size or other capacity information relating to the unit of memory; and/or other information concerning the memory unit, such as statistical information regarding usage of the memory unit or the items cached in the memory unit. These are but illustrative examples. Also, it should be understood that while cache store 60 is depicted schematically to include the information in a table, a variety of other data structures or mechanisms may be employed to maintain the information store.

Local memory managers 34 may also be configured to receive and respond to requests to insert particular data items into clustered memory cache 22. As will be explained in more detail below, these cache insertion requests can arise from and be initiated by actions of metadata service 30 and clients 32. In some cases, the local memory manager may deny the cache insertion request. One situation where an insertion request can be denied is if the request is directed to a block containing an item that cannot be immediately evicted, for example because there are active client references to the cached item.

Assuming, however, that the insertion request is grantable by the local memory manager, the local memory manager acknowledges and grants the request. The memory manager also coordinates the population of the respective memory block with the data item to be cached, and appropriately updates any associated information for the block in the cache store (e.g., cache store 60).

Similarly, each local memory manager 34 is configured to receive and respond to requests to evict items from its associated portion of clustered memory cache 22. As with insertion requests, the eviction requests can arise from actions of the metadata service 30 and one or more of clients 32, as will be explained in more detail below. Assuming the request is grantable, the memory manager acknowledges and grants the request, and flushes the memory block or takes other appropriate action to make the memory block available for caching of another item.

In some example embodiments, it will be desirable to notify clients 32 when items are to be evicted from the clustered memory cache. Accordingly, the local memory managers may also be configured to maintain back references to clients accessing items in the cache. For example, assume a client requests access to an item in a portion of the cache managed by a memory manager, and that the memory manager has responded by granting a read lock to the client. Having maintained a back reference to the client (e.g., in cache store 60), the local memory manager can then notify the client in the event of a pending eviction and request that the client release the lock.

As discussed above, each local memory manager may be local to and associated with a different portion of the clustered memory cache. Although memory managers may be referred to herein as "local" memory managers, they need not be physically proximate to the physical memory. The local memory managers may be located elsewhere in some embodiments. In the example of FIG. 1, each of the distinct computing systems 26 has an individual memory manager responsible for the physical memory 24 contributed by the computing system 26 to the clustered cache. Alternatively, multiple local memory managers may be employed within a computing system.

In particular embodiments, clustered memory cache 22 may operate in a write-through mode; that is, write operations (initiated, for example, by client 32) are not completed until data that has been written to cache 22 is also flushed to a backing store such as auxiliary store 50. In other embodiments, clustered memory cache 22 may operate in a write-back mode; that is, write operations (initiated, for example, by client 32) are completed as soon as the data is written to cache 22, and write data is flushed to a backing store such as auxiliary store 50 at a later time. This later time may occur, for example, when a client 32 issues a flush on all cache blocks to which it has written.

In particular embodiments, clustered memory cache 22 may include cache data replication functionality, described in further detail below. In an embodiment including the cache data replication functionality, physical memory 24 may include data representing a portion of clustered memory cache 22 as well as one or more replica stores of data representing another portion or portions of clustered memory cache 22, with both the data and the replica stores managed by local memory manager 34. As an example, with reference to FIG. 1, computing system 1 includes local memory manager MM1. The physical memory 24 associated with MM1 may include both data representing a portion of clustered memory cache 22, as well as a replica store of data representing the portion of clustered memory cache 22 associated with local memory manager MM2. Additionally, in an embodiment with cache data replication functionality, each unit of physical memory 24 may include certain metadata including, for example, memory 24 identifier (e.g., manufacture ID, worldwide name, etc.); for each replica store hosted by memory 24, the identifier, state, and primary store; for each replica store replicating data in memory 24, the replica store identifier and host memory 24; and for each cache block in memory 24, whether the cache block is dirty/unflushed or clean (and if dirty, when the cache block became dirty), and if dirty/unflushed, the replica stores where this block is replicated.

Figure 3:
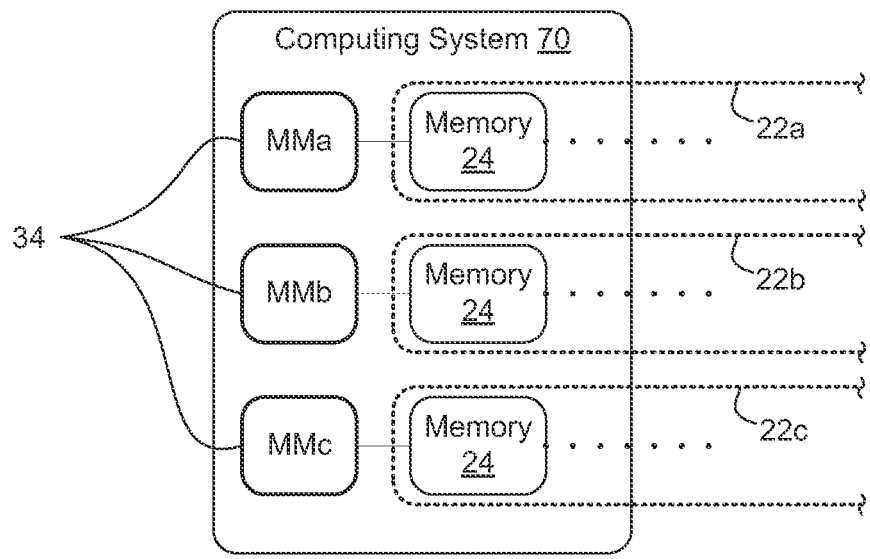
FIG. 3 schematically depicts another example memory manager.

FIG. 3 depicts an example of an alternate memory manager configuration. As in the previous example, computing system 70 is one of several physically distinct computing systems contributing physical memory 24 to a distributed memory resource. The example of FIG. 3 illustrates two configuration variations that may be applied to any of the examples discussed herein. First, the figure demonstrates a configuration in which the memory contributed from a single computing system is allocated in to multiple different segments. The individual segments, which may or may not be contiguous, are each managed by a different memory manager 34 (individually and respectively designated as MMa, MMb and MMc). As described below, the use of multiple memory managers and memory segments on a single computing system may be used to allow exportation of physical memory to multiple different aggregate memory resources. On the other hand, it may be desirable to employ multiple memory managers even where the memory is contributed to a single cache cluster or other shared memory resource.

Secondly, the figure demonstrates the use of multiple different clusters. Specifically, each local memory manager and memory segment pairing in the FIG. 3 example belongs to a different cache cluster (i.e., clusters 22a, 22b and 22c). Multiple cluster configurations may be employed for a variety of reasons, such as for security reasons, access control, and to designate specific clusters as being usable only by specific applications.

Local memory managers 34 may also be configured to report out information associated with the respective portions of clustered memory cache 22. As discussed above with reference to FIG. 2, each memory manager may include a cache store 60 with information about the memory manager's memory locations. This information may be provided from time to time to metadata service 30, configuration manager 42, and/or other components of the systems described herein.

In particular embodiments, local memory manager may examine all possible local memory 24 devices upon startup or upon a plug-and-play event (indicating that memory 24 has been added to the associated computing system 26) to determine which memory 24 belongs to clustered cache 22. This may, in particular embodiments, be determined by examining the memory identifier in the metadata of memory 24. If it is determined that memory 24 belongs to clustered cache 22, local memory manager 34 may update entries in its cache store 60 and communicate data regarding memory 24 to metadata service 30 or configuration manager 42 (including, for example, the journal in configuration manager 42). The determination whether memory 24 belongs to clustered cache 22 may, in some embodiments, be determined by examining an entry in the journal of configuration manager 42. In particular embodiments, local memory manager 34 may not allow access to the newly-added memory 24 until the memory 24 has been approved by the configuration manager 42 (e.g., approved as not being obsolete after an examination of an entry in the journal of the configuration manager).

Metadata Service Data Store

For example, as will be described in more detail below, metadata service 30 can provide a centralized, or relatively centralized, location for maintaining status information about the clustered cache. In particular, in FIG. 1, memory managers MM1, MM2, etc. through MMN may be considered to all be within a domain that is assigned to metadata service 30. Metadata service 30 can monitor the domain, for example by maintaining information similar to that described with reference to cache store 60, but for all of the memory managers in the domain.

More particularly, metadata service 30 may include a metadata service data store 80 for maintaining information associated with the memory locations in its domain that form the clustered cache. In one class of examples, and as shown in FIG. 1, metadata service data store 80 may include multiple records 82. Specifically, a record 82 is provided for each of the physical memory units 24 of clustered memory cache 22. For example, assume clustered memory cache 22 includes 64 million 8-kilobyte memory blocks (512 gigabytes of addressable cache memory) spread across computing systems 1 through N and local memory managers MM1 through MMN. In this example, metadata service data store 80 could be configured with 64 million records (rows), with each pertaining to one of the cache memory blocks in the cluster. In an alternate example, each record could apply to a grouping of memory locations. Numerous other arrangements are possible.

Various additional information may be associated with the records of metadata service data store 80. In particular, the metadata service may store a tag for each of the memory locations of the cache, as shown in the figure. In one example, the tag allows a requesting entity, such as one of clients 32, to readily determine whether a particular data item is stored in the cache. Specifically, the tag column entries may each be a hash of the path/filename for the data item resident in the associated memory block. To determine whether a requested data item (e.g., a file) is present in the cache, the path/filename of the requested item may be hashed using the same hash routine and the resulting hash compared to the tag column entries of the metadata service data store 80. The path and filename hash described above is provided by way of example; hash methodologies may be employed on other data, and/or other identification schemes may be employed.

Metadata service data store 80 may also indicate an associated local memory manager for each of its records, as shown at the exemplary column designated "MM." For example, data store 80 could indicate that a first memory block or range of memory blocks was managed by memory manager MM1, while a second bock or range of blocks was managed by local memory manager MM2. With such a designation, in the event that a query for a particular item reveals the item is present in the cache (e.g., via a match of the path/filename hash described above), then the response to that query can also indicate which local memory manager 34 should be dealt with to read or otherwise access the cached item.

In the example of FIG. 1, data store 80 also includes a status indication for each of the cache blocks. In one example, each of the cache blocks is indicated as having one of the following statuses: (1) empty, and therefore available to be populated; (2) insertion pending, indicating that the memory block is in the process of being populated with a newly-inserted cached item; (3) active, indicating that the memory block presently contains an active cached data item; or (4) deletion pending, indicating that the data item in the cache block is being deleted. It will be appreciated that these are illustrative examples, and other status information and flags may be employed. The specific exemplary status indications referred to above will be described in further detail below.

The tag, memory manager and status entries described above with reference to the cache blocks in data store 80 are non-limiting examples. As described in more detail below, metadata service 30 and its policy engine 90 typically play a role in implementing various policies relating to the configuration and usage of clustered memory cache 22. Application of various policies can be dependent upon rates of eviction and insertion for a cache block or data item; temporal information such as the time a data item has been cached in a particular block, time since last access, etc.; and/or other information concerning the cache block, such as statistical information regarding usage of the cache block or the data items cached therein.

It will thus be appreciated that the information maintained in metadata service data store 80 may overlap to some extent with the information from the various cache stores 60 (FIG. 2) of the local memory managers. Indeed, as previously indicated, the described system can be configured so that the memory managers provide periodic updates to maintain the information in the metadata service data store 80.

Also, the metadata service may be distributed to some extent across the network infrastructure. For example, multiple mirrored copies of the metadata service may be employed, with each being assigned to a subset of local memory managers. Memory manager assignments could be dynamically reconfigured to achieve load balancing and in the event of failure or other changes in operating conditions of the environment.

Operational Examples—Cache Hit, Cache Miss

Various examples will now be described illustrating how clients 32 interact with metadata service 30 and local memory managers 34 to access clustered memory cache 22. The basic context of these examples is as follows: a particular client 32 (FIG. 1) is running on an applications server executing a data-intensive financial analysis and modeling program. To run a particular analysis, the program may need to access various large data files residing on auxiliary store 50.

In a first example, the financial analysis program makes an attempt to access a data file that has already been written into clustered memory cache 22. This may have occurred, for example, as a result of another user causing the file to be loaded into the cache. In this example, client 32 acts as a driver that provides the analysis program with access to the clustered memory cache 22. Other example embodiments include client 32 operating in user mode, for example as an API for interacting with the clustered resource.

In response to the client request for the data file, metadata service 30 determines that the requested file is in fact present in the cache. This determination can be performed, for example, using the previously-described filename/path hash method. Metadata service 30 then responds to the request by providing client with certain metadata that will enable the client to look to the appropriate portion of the clustered memory cache (i.e., the portion containing the requested file).

In particular, metadata service 30 responds to the request by identifying the particular local memory manager 34 which is associated with the portion of the cache containing the requested file. This identification may include the network address of the local memory manager, a logical block address or a cache block number, or another identifier allowing derivation of the address. Once the client has this information, the client proceeds to negotiate with the local memory manager to access and read the requested file from the relevant block or blocks managed by the memory manager. This negotiation may include granting of a read lock or other reference from the local memory manager to the client, and/or provision of RDMA keys as described above.

As shown in FIG. 1, client 32 may include a local store 92 of metadata. In the above example, this local store may be used by the client to record the association between the requested data file and the corresponding local memory manager and respective portion of the clustered cache. Thus, by consulting local store 92, subsequent cache accesses to the cached file can bypass the step of querying metadata service 30. Indeed, clients 32 may be implemented to first consult local store 92 before querying metadata service 30, thereby allowing clients to more directly and efficiently access cached items. Metadata service 30 may thus function in one respect as a directory for the clustered memory cache 22. Clients having up-to-date knowledge of specific entries in the directory can bypass the directory and go directly to the relevant local memory manager.

In particular embodiments, local store 92 may include metadata such as a list of client write or read references to portions of clustered cache 22. As an example, client 32 may keep track of which cache blocks it holds write references to (as well as which local memory manager 34 manages these cache blocks) in local store 92. By keeping track of these write references, client 32 may be able to communicate with the corresponding local memory managers 34 and, upon request by a local memory manger 34, release certain of its write references to allow the local memory manager 34 to make room in its corresponding memory 24 for new data to be cached. Local store 92 may also contain a queue of which cache blocks are most- or least-recently used by client 32. Thus, if a particular cache block is the least recently used cache block by client 32, then it will be at the front of the least-recently-used (LRU) queue in local store 92 and may be the first write reference that client 32 releases, either voluntarily or when asked by a local memory manager 34. If there is a pending input/output request on a particular cache block, then the reference to that cache block may move to the back of the least-recently-used (LRU) queue in local store 92. In particular embodiments, there may be a limit on the number of cache block references (write, read, or some combination of both) that a client 32 is allowed to have in using clustered memory cache 22. This limit may be tracked, for example, by metadata service 30 (e.g., the policy engine 90), by one or more local memory mangers 34 (described below), or may be tracked and enforced at client 32 itself.

Another example will now be considered, in which the file requested by the analysis program is not present in clustered memory cache 22. As before, the analysis program and/or client 32 cause the file request to issue, and the request is eventually received at metadata service 30. Prior to messaging of the request to metadata service 30, however, the local client store 92 of metadata is consulted. In this case, because the requested file is not present in the cache, no valid metadata will be present in the local store. The request is thus forward to metadata service 30.

In response to the request, metadata service 30 cannot respond with a memory manager identification, as in the previous example, because the requested file is not present in the clustered memory cache. Accordingly, the hash matching operation, if applied to metadata service data store 80, will not yield a match.

The metadata service can be configured to implement system policies in response to this type of cache miss situation. Specifically, policies may be implemented governing whether the requested item will be inserted into the clustered memory cache, and/or at what location in the cache the item will be written. Assuming clustered cache 22 is populated with the requested item, the metadata service data store 80 will be updated with metadata including the designation of the responsible memory manager 34. This metadata can then be supplied in response to the original request and any subsequent requests for the item, so that the cached version can be accessed through client interactions with the appropriate memory manager.

Policies

The systems and methods described herein may be configured with various policies pertaining to the shared memory resource. Policies may control configuration and usage of the clustered memory cache; client access to the cache; insertion and eviction of items to and from the cache; caching of items in particular locations; movement of cached items from one location to another within the cache; etc. Policies may also govern start/stop events, such as how to handle failure or termination of one of the computing systems contributing memory locations to the cluster. These are non-limiting examples—a wide variety of possibilities exist.

In the example of FIG. 1, configuration manager 42, admin interface 46 and policy manager 44 perform various functions in connection with the policies. In particular, admin interface 46 can provide a command-line, graphical or other interface that can be used by a system administrator to define policies and control how they are applied. Configuration manager 42 typically is adapted to coordinate startup events, such as the login or registration of entities as they come on-line. In many settings, startup procedures will also include distribution of policies.

For example, in FIG. 1, initialization of clients 32 is handled by configuration manager 42. Specifically, when coming on-line, each client 32 initializes and registers with configuration manager 42. Configuration manager 42 provides the initializing client with addresses of the appropriate metadata service 30. Configuration manager 42 may also retrieve relevant policies from policy manager 44 and distribute them to the client, which stores them locally for implementation via client policy engine 94 (FIG. 1).

Configuration manager 42 typically also coordinates registration and policy distributions for metadata service 30 and local memory managers 34. The distributed policies may be stored locally and implemented via metadata service policy engine 90 (FIG. 1) and memory manager policy engines 64 (FIG. 2), respectively. From time to time during operation, the size and underlying makeup of the clustered memory resource may change as local memory managers launch and terminate, either intentionally or as a result of a failure or other unintentional system change. These startups and terminations may be handled by the configuration manager, to provide for dynamic changes in the shared memory resource. For example, during periods where heavier usage volume is detected (e.g., an escalation in the number of cache insertion requests), the configuration manager may coordinate with various distributed devices and their associated memory managers to dynamically scale up the resource. On the other hand, performance lags or other circumstances may dictate a dynamic adjustment where one or more memory managers are taken off-line. As described in more detail below, the present system may be configured to permit migration of cache data from one location to another in the shared resource. The startups and terminations described above provide examples of situations where such data migration may be desirable.

In particular embodiments, configuration manager 42 may include a journal (or any suitable data structure) containing state information about clustered cache 22, stored locally in persistent or non-volatile memory. Because the journal is maintained in persistent memory in configuration manager 42, even if the configuration manager fails (or, in the case of multiple configuration managers, if any or all of the configuration managers 42 of network 20 fail), cache state information may still be maintained. In particular embodiments, the journal may be mirrored elsewhere in network 20 or in clustered memory cache 22. Even in the case of a complete failure of all copies of the journal, the journal may be reconstructed from metadata information stored in memory 24 (described above); if memory 24 is non-volatile memory, then the journal may be reconstructed even after a complete shutdown of cache 22.

The journal of the configuration manager 42 may include the following information about each memory unit 24 of the clustered cache 22: one or more memory 24 identifiers (e.g., manufacture ID, worldwide name, cache-specific name, etc.), memory 24 type (e.g., RAM, flash, persistent local disk), memory 24 size, memory 24 state (e.g., inactive, active, failed, failed and recovered, removed), an identifier of the local memory manager 34 that manages memory 24 (e.g., the local memory manager that most recently registered memory 24 with the journal), associated replica store identifiers (e.g., physical IDs of memory 24 containing any associated replica stores, cache-specific IDs of memory 24 containing replica stores), an identifier of the local memory manager(s) 34 of the associated replica store(s), associated replica store states, and replica stores that are currently being re-hosted on associated replica stores. Additionally, the journal may also include information about the one or more metadata services 30 that are part of the clustered cache 22 including, for example, the identifiers of any metadata servers that have been expelled from cache 22. The journal may also include partition map generation numbers, local memory manager 34 membership generation numbers, and, for each auxiliary store 50 (or each device in auxiliary store 50), a device pathname and a device state.

The configuration manager 42 may communicate with metadata service 30 (including, for example, data store 80), clients 32, local memory managers 34 (including, e.g., cache store 60), or any other part of network 20 to obtain information to update entries in its journal. Additionally, entries in the journal may be examined by configuration manager 42 to communicate information to metadata service 30 (including, for example, data store 80), clients 32, local memory managers 34 (including, e.g., cache store 60), or any other part of network 20.

As an example, if a local memory manager 34 communicates to configuration manager 42 that a new physical memory 24 has been detected (e.g., upon startup or upon a plug-and-play event) and also communicates the memory identifier in the metadata of new memory 24, the configuration manager 42 may examine its journal to determine whether the memory identifier corresponds to an existing memory unit in cache 22 or whether a new entry must be created for the new memory 24. Additionally, the configuration manager may also determine, if the identifier corresponds to an existing memory unit in cache 22, whether the existing memory unit is valid for use (e.g., based on the memory state—whether failed, recovered, removed, etc.). Configuration manager 42 may then communicate to local memory manager whether the "new" memory 24 may be used by local memory manager 34. If so, local memory manager 34 may update entries in its cache store 60 and communicate data regarding memory 24 to metadata service 30 or configuration manager 42.

As another example, a local memory manager 34 may report the failure of a unit of memory 24. Configuration manager 42 may update its journal to record the new state of the memory 24, and may examine its journal to determine whether a replica store exist for memory 24, and if so, which local memory manager manages this replica store. Configuration manager 42 may communicate with the local memory manger managing the replica store and tell it to "absorb" the replica as a normal (non-replica) portion of the cache 22, and subsequently the journal may be updated. Configuration manager 42 may also communicate with yet another local memory manager to create a new replica store for the absorbed replicas (e.g., in the same physical memory 24 containing replica stores for the local memory manager who has "absorbed" the replica), and subsequently update the journal.

As indicated above, policy manager 44 may be configured to provide a master/central store for the system policy definitions, some or all of which may be derived from inputs received via admin interface 46. Policy manager 44 may also validate or verify aggregate policies to ensure that they are valid and to check for and resolve policy conflicts. The policy manager 44 typically also plays a role in gathering statistics relating to policy implementations. For example, the policy manager may track the number of policy hits (the number of times particular policies are triggered), and/or the frequency of hits, in order to monitor the policy regime, provide feedback to the admin interface, and make appropriate adjustments. For example, removal of unused policies may reduce the processing overhead used to run the policy regime.

As should be appreciated from the foregoing, although the policies may be defined and managed centrally, they may also be distributed and implemented at various locations in the system. Furthermore, the policy ruleset in force at any given location in the system may vary based on the nature of that location. For example, relative to any one of memory managers 34 or clients 32, metadata service 30 has a more system-wide global view of clustered memory cache 22. Accordingly, policy rulesets affecting multiple clients or memory managers can be distributed to and implemented at metadata service 30.

Policy Examples—Client Filter

Referring to clients 32, and more particularly to the client policy engines 94 incorporated into each client, various exemplary client-level policy implementations will be described. Many example policies implemented at the clients operate as filters to selectively control which client behaviors are permitted to impact the shared memory resource. More specifically, the client policy engine may be configured to control whether requests for data items (e.g., an application attempting to read a particular file from auxiliary store 50) are passed on to metadata service 30, thereby potentially triggering an attempted cache insertion or other action affecting the clustered cache.

The selective blocking of client interactions with metadata service 30 operates effectively as a determination of whether a file or other data item is cacheable. This determination and the corresponding policy may be based on a wide variety of factors and criteria. Non-limiting examples include:

(1) Size—i.e., items are determined as being cacheable by comparing the item size to a reference threshold. For example, files larger than N bytes are cacheable.

(2) Location—i.e., items are determined as being cacheable depending on the location of the item. For example, all files in a specified path or storage device are cacheable.

(3) Whitelist/Blacklist—a list of files or other items may be specifically designated as being cacheable or non-cacheable.

(4) Permission level or other flag/attribute—for example, only read-only files are cacheable.

(5) Application ID—i.e., the cacheable determination is made with respect to the identity of the application requesting the item. For example, specified applications may be denied or granted access to the cache.

(6) User ID—e.g., the client policy engine may be configured to make the cacheable determination based on the identity of the user responsible for the request.

(7) Time of Day.

In addition, these examples may be combined (e.g., via logical operators). Also, as indicated above, the list is illustrative only, and the cacheability determination may be made based on parameters other than the cited examples.

Policy Examples—Cache Insertion and Cache Eviction

Cache insertion policies may determine whether or not a file or other data item may be inserted into clustered memory cache 22. For example, cache insertion policies may be applied by metadata service 30 and its policy engine 90, though application of a given policy may be based upon requests received from one or more clients 32, and/or upon metadata updates and other messaging received from the local memory managers 34 and maintained in metadata service data store 80 (FIG. 1).

In some examples, administrators or other users are able to set priorities for particular items, such as assigning relatively higher or lower priorities to particular files/paths. In addition, the insertion logic may also run as a service in conjunction with metadata service 30 to determine priorities at run time based on access patterns (e.g., file access patterns compiled from observation of client file requests).

Further non-limiting examples of cache insertion policies include:

(1) Determining at metadata service 30 whether to insert a file into clustered memory cache 22 based on the number and/or frequency of requests received for the file. The metadata service can be configured to initiate an insertion when a threshold is exceeded.

(2) Determining at metadata service 30 whether to insert a file into clustered memory cache 22 based on available space in the cache. This determination typically will involve balancing of the size of the file with the free space in the cache and the additional space obtainable through cache evictions. Assessment of free and evictable space may be based on information in metadata service data store 80.

(3) Determining at metadata service 30 whether to insert a file into clustered memory cache 22 based on relative priority of the file.

Metadata service 30 may also implement eviction policies for the clustered memory cache 22. Eviction policies determine which data items to evict from the cache as the cache reaches capacity. Eviction policies may be user-configured (e.g., by an administrator using admin interface 46) based on the requirements of a given setting, and may be applied based on metadata and other information stored at metadata service 30 and/or memory managers 34.

In particular, metadata service 30 may reference its data store 80 and predicate evictions based on which memory location within its domain has been least recently used (LRU) or least frequently used (LFU). Other possibilities include evicting the oldest record, or basing evictions on age and frequency based thresholds. These are provided as examples, and evictions may be based upon a wide variety of criteria in addition to or instead of these methods.

As previously mentioned, although metadata service 30 has a global view of the cache and is therefore well-positioned to make insertion/eviction determinations, the actual evictions and insertions are carried out by the memory managers 34 in some embodiments. Indeed, the insertion/eviction determinations made by metadata service 30 are often presented to the memory managers as requests that the memory managers can grant or deny. In other cases, the memory manager may grant the request, but only after performing other operations, such as forcing a client to release a block reference prior to eviction of the block.

In other cases, metadata service 30 may assign higher priority to insertion/eviction requests, essentially requiring that the requests be granted. For example, the overall policy configuration of the system may assign super-priority to certain files. Accordingly, when one of clients 32 requests a super-priority file, if necessary the metadata service 30 will command one or more memory managers 34 to evict other data items and perform the insertion.

In many embodiments, however, the local memory managers have authority over the cache memory locations that they manage, and are able in certain circumstances to decline requests from metadata service 30. One reason for this is that the memory managers may have more accurate and/or current information about their associated portion of the cache. Information at the memory managers may be more granular, or the memory managers may maintain certain information that is not stored at or reported to metadata service 30. On the other hand, there may be delays between changes occurring in the cache and the reporting of those changes from the respective memory manager to metadata service 30. For example, metadata service 30 might show that a particular block is evictable, when in fact its memory manager had granted multiple read locks since the last update to the metadata service. Such information delays could result from conscious decisions regarding operation of the clustered cache system. For example, an administrator might want to limit the reporting schedule so as to control the amount of network traffic associated with managing the shared memory resource.

The above-described distribution of information, functionality and complexity can provide a number of advantages. The highly-distributed and non-blocking nature of many of the examples discussed herein may allow them to be readily scaled in large datacenter environments. The distributed locking and insertion/eviction authority carried out by the memory managers may allow for many concurrent operations and reduce the chance of any one thread blocking the shared resource. Also, the complicated tasks of actually accessing the cache blocks are distributed across the cluster. This distribution is balanced, however, by the relatively centralized metadata service 30, and the global information and management functionality it provides.

Furthermore, it should be appreciated that various different persistence modes may be employed in connection with the clustered memory resource described herein. In many of the examples discussed herein, a read-only caching mode is described, where the clustered resource functions to store redundant copies of data items from an underlying auxiliary store. This may enhance performance because the cluster provides a shareable resource that is typically faster than the auxiliary store where the data originates. However, from a persistence standpoint, the data in the cluster may be flushed at any time without concern for data loss because the cluster does not serve as the primary data store. Alternatively, the cluster may be operated as a primary store, with clients being permitted to write to locations in the cluster in addition to performing read operations. In this persistence mode, the cluster data may be periodically written to a hard disk or other back-end storage device.

A further example of how the clustered memory resource may be used is as a secondary paging mechanism. Page swapping techniques employing hard disks are well known. The systems and methods described herein may be used to provide an alternate paging mechanism, where pages are swapped out the high performance memory cluster.

Policy Examples—Locality Within Clustered Cache

The exemplary policy regimes described herein may also operate to control the location in clustered memory cache 22 where various caching operations are performed. In one class of examples, metadata service 30 selects a particular memory manager 34 or memory managers to handle insertion of a file or other item into the respective portion of the cache. This selection may be based on various criteria, and may also include spreading or striping an item across multiple portions of the cluster to provide increased security or protection against failures.

In another class of examples, the metadata service coordinates migration of cached items within clustered memory cache 22, for example from one location to another in the cache. This migration may be necessary or desirable to achieve load balancing or other performance benefits.

Figure 4:
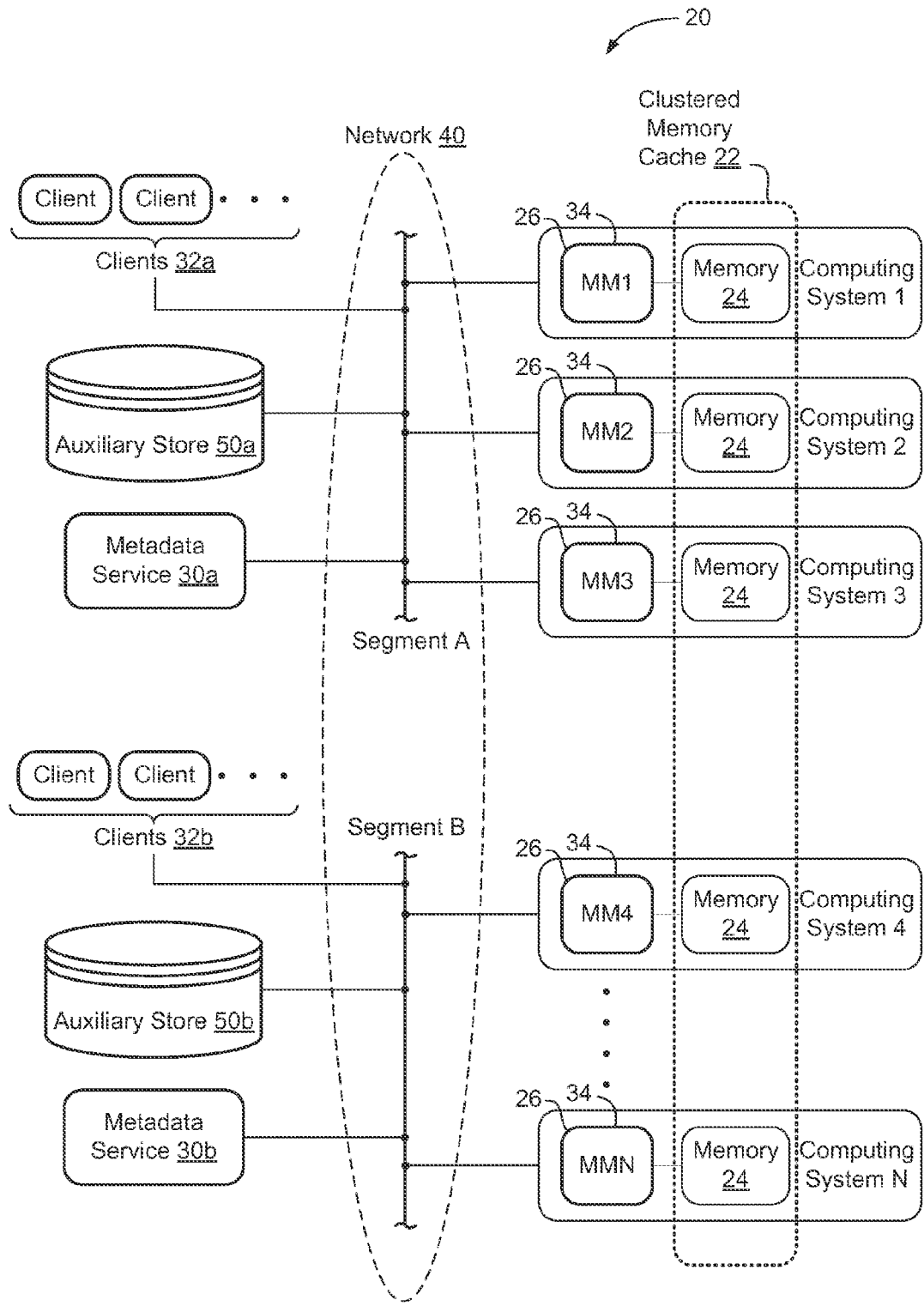
FIG. 4 schematically depicts an example distributed shared memory environment with a clustered memory resource distributed across multiple network segments.

A variety of exemplary locality policies will now be described, at times with reference to FIG. 1 and FIG. 4. FIG. 4 depicts another example of a shared-memory computer network 20. The depicted example is similar in many respects to the example of FIG. 1, except that network 40 includes multiple segments. Two segments are depicted: Segment A and Segment B. The segments may be separated by a router, switch, etc. As before, clustered memory cache 22 is comprised of memory 24 from multiple physically distinct computing systems 26, however some portions of the cache are local to network Segment A, while others are local to network Segment B. Clients 32a, auxiliary store 50a and metadata service 30a are on Segment A, while Clients 32b, auxiliary store 50b and metadata service 30b are on Segment A In a first example, cache insertion locality is determined based on relative usage of memory locations 24. Usage information may be gathered over time and maintained by memory managers 34 and the metadata services, and maintained in their respective stores. Usage may be based on or derived from eviction rates, insertion rates, access frequency, numbers of locks/references granted for particular blocks, etc. Accordingly, when determining where to insert an item in clustered memory cache 22, the metadata service may select a less utilized or underutilized portion of the cache to achieve load balancing.

The metadata service may also coordinate migration of cache items from one location to another based on relative usage information. For example, if information in metadata service data store 80 (FIG. 1) indicates unacceptable or burdensome over-usage at memory managers MM2 and MM3, metadata service 30 can coordinate relocation of some of the data items to other memory managers (e.g., memory managers MM1 or MM4).

In another example, locality policies are implemented based on location of the requesting client. Assume for example, with reference to FIG. 4, that a cache insertion request is triggered based on an application associated with one of clients 32a (Segment A). The policy configuration could be implemented such that this would result in an attempted insertion at one of the Segment A memory managers (MM1, MM2 or MM3) instead of the Segment B managers. In yet another example, if a client 32a has an application that is located on a computing system 26 on Segment A, a policy configuration could be implemented such that this would result in an attempted insertion at the Segment A memory manager (MM1, MM2, or MM3) that is co-located on the same computing system 26 as the application.

In particular embodiments, a locality policy may be implemented based on the location of the client most likely to access the data. As an example, in the case of virtualization environments, it is often the case that a single virtual machine (a type of client application) accesses a cache block without overlapping or sharing this cache block with another client 32 or client application. Thus, as described above, one locality policy may be to locate the requested data from auxiliary store 50 in a cache block in the memory 24 of the same computing system 26 hosting the virtual machine application. Because it is unlikely (in the case of a virtual machine application) that a request for that same data would come from another client application, if a different memory manager 34 (or computing system 26) seeks to access this same data due to a client request, it is likely that the virtual machine application has actually migrated to a portion of network 20 associated with this different memory manager 34 (or computing system 26). Thus, in one implementation of this locality policy (whether for virtual machine applications or general client applications), a timer is started when a second memory manager (or computing system) seeks to access (at the request of a client application) the same data that is stored in a cache block co-located with a first client application and managed by a first memory manager that created (or allocated or wrote) the cache block. Metadata associated with the cache block (located, e.g., in cache store 60 or in memory 24 itself) may contain an identifier for the client or client application who initially requested the cache block. If a certain amount of time has passed (e.g., several seconds or several milliseconds) since the first memory manager or client application has accessed the cache block, it may be determined that the first client application has actually migrated to a second portion of network 20 associated with the second memory manager. The cache block may then be migrated to the second memory manager's associated memory in order to serve the client application in its new location. In particular embodiments, once a cache block has been migrated, a second timer is started, such that the cache block cannot be migrated (for locality policy reasons) again until the second timer reaches a predetermined value (e.g., one hour). The pattern of access to a particular cache block by client applications (or memory managers) may, in particular embodiments, be stored and tracked (e.g. in cache stores 60) before it is determined whether a migration of a client application has occurred and whether the cache block should also be migrated. Additionally, a variety of statistics regarding accesses to individual cache blocks or groups of associated or correlated cache blocks may also be tracked by memory managers 34 and stored in cache store 60. The locality policy may be turned on or off depending on a variety of factors, and it may be applied globally within memory cache 22 or locally within certain segments of network 40. For example, the policy may be turned on or off depending on whether a particular logical volume contains support for virtualized data. Additionally, certain clients may have more or less priority in terms of the locality policy than other clients. For example, even if a particular client application accesses a cache block frequently, if it is a low priority client application, it will not trigger a migration event for the cache block. In yet another embodiment, data relating to the performance of access times (collected, e.g., from clients 32) may be used to determine whether network 20 has slow or fast links, and to use this information in determining whether and where to migrate cache blocks within the network. Metadata relating to this locality policy (stored, e.g., in cache store 60 or in memory 24) may include bits indicating the type of placement policy, a time stamp for the last access to the cache block, and the network address (e.g., IP address) for the last accessor. Any or all of this data may be communicated to or stored in metadata service 30 (including data store 80) or configuration manager 42 (including a journal), and any locality policy may be controlled by metadata service 30, configuration manager 42, policy manager 44, or any other suitable component of computer network 20.

In another example, the relative location of the underlying data item is factored into the locality policy. Referring to FIG. 4, policies may be configured to specify that files located on auxiliary store 50b (on Segment B) are to be cached with the Segment B memory managers 34. This may be the case even where the requesting client is located on Segment A. Where policy implementations compete, as in this example, other aspects of the policy configuration can resolve the conflict, for example through prioritization of various components of the overall policy regime.

From the above, it should be understood that locality may be determined by tracking usage patterns across the cluster and migrating memory blocks to nodes optimized to reduce the total number of network hops involved in current and anticipated uses of the cluster. In many cases, such optimization will significantly reduce latency and potential for network congestion. The usage data may be aggregated from the clients by the configuration manager and propagated to the metadata service(s) as a form of policy that prioritizes various cache blocks.

The policy implementation may also be employed to detect thrashing of data items. For example, upon detecting high rates of insertion and eviction for a particular data item, the system may adjust to relax eviction criteria or otherwise reduce the thrashing condition.

A further locality example includes embodiments in which a block or data item is replicated at numerous locations within the clustered memory resource, described further below. In certain settings, such replication will improve fault tolerance, performance, and may provide other advantages. For example, in a caching system, multiple copies of a given cache block could be sited at multiple different locations within the clustered cache. A metadata service query would then result in identification of one of the valid locations. In some embodiments, the second valid location may be maintained as a replica purely for fault tolerance purposes and may not be directly accessible to clients.

Figure 5:
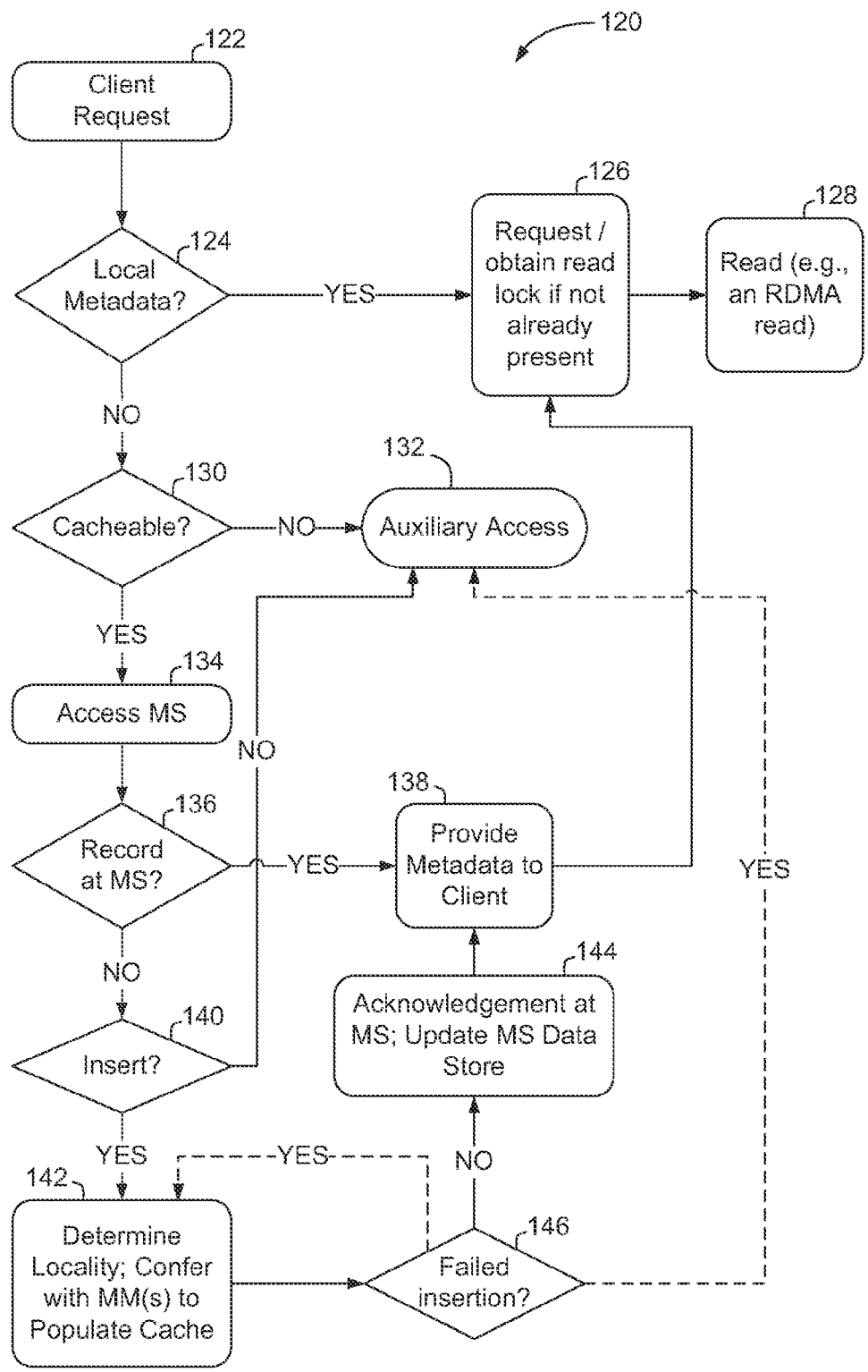
FIG. 5 depicts an example method for using a distributed shared memory resource.

Example Method—Flowchart—FIG. 5

Referring now to FIG. 5, an example shared memory method 120 will be described, in the context of client entities accessing a clustered memory cache. As before, the clustered memory cache may be aggregated from and comprised of physical memory on multiple physically distinct computing systems. The context further includes attempts by the clients to access data items that are stored in an auxiliary store, but which may also be inserted into the clustered memory cache.

The method may generally include running a local memory manager on each of a plurality of physically distinct computing systems operatively coupled with each other via network infrastructure. One or more metadata services are instantiated, and operatively coupled with the network infrastructure. Communications are conducted between the metadata service(s) and the local memory managers to provide the metadata service with metadata (e.g., file/path hashes, usage information/statistics, status, etc.) associated with the physical memory locations. The metadata service may then be operated to provide a directory service and otherwise coordinate the memory managers, such that the physical memory locations are collectively usable by clients as an undifferentiated memory resource.

Referring specifically to the figure, at 122, method 120 may also include issuing of a client request. As in the examples described above, the request may originate or issue from an operating system component, application, driver, library or other client entity, and may be directed toward a file or other data item residing on a file server, disk array or other auxiliary store.

As shown at 124, method 120 may also include checking a local store to determine whether metadata is already available for the requested item. The existence of local metadata indicates that the requested item is currently present and active in the clustered memory cache, or at least that it was at some time in the past. If local metadata is available, a read lock is obtained if necessary (126) and the item is read from its location in clustered memory cache (128).

In the context of FIG. 1, these steps could correspond to an application request, via client 32, for a particular file located on auxiliary store 50. In response to the request, client 32 would retrieve valid metadata for the requested file from local metadata store 92. The retrieved metadata would indicate the particular memory manager 34 for the data item, and/or would otherwise indicate the location of the data item in clustered memory cache 22. The requesting client would then access the item from its location in the cache, for example by interacting with the respective memory manager to obtain a read lock and perform an RDMA read of the cached item.

Continuing with FIG. 5, if it cannot be determined from the local store that the requested item is or had been cached in the shared memory resource, method 120 may include a determination of whether the item is eligible for caching, as shown at 130. Referring again to FIG. 1, client 32 and its policy engine 94 provide examples of components configured to make the eligibility determination of step 130. Specifically, as discussed above, the client and policy engine may filter the passing of requests to metadata service 30, and thereby filter the usage of clustered memory cache.

If the requested item is not eligible for caching, the request is satisfied by means other than through the clustered memory cache. In particular, as shown at 132, the client request is satisfied through auxiliary access, for example by directly accessing a back-end file system residing on auxiliary store 50 (FIG. 1).

Proceeding to 134, a metadata service may be accessed for eligible requests that cannot be initiated with locally stored metadata. Similar to the inquiry at step 124, the metadata service is queried at 136 to determine whether metadata exists corresponding to the client request. If the metadata service has current metadata for the request (e.g., the address of a local memory manager overseeing a portion of cache 22 where the requested item is cached), then the metadata is returned to the requesting entity (138), and the access and read operations may proceed as described above with reference to steps 126 and 128.

The absence of current metadata at the queried metadata service is an indication that the requested item is not present in the shared memory resource (e.g., clustered memory cache 22 of FIG. 1 does not contain a non-stale copy of a file requested by one of clients 32). Accordingly, as shown at 140, method 120 may include determining whether an attempt will be made to insert the requested item into the shared memory. If the item will not be inserted, the client request may be serviced other than through use of the shared resource, as previously described and shown at 132.

Continuing with FIG. 5, if an insertion is to be made, method 120 may include determining the locality of the insertion, as shown at 142. More particularly, an assessment may be made as to a specific location or locations within the shared memory resource where the item is to be placed.

As in the various examples discussed with reference to FIG. 1, the locality determination may be made based on various parameters and in accordance with system policy configurations. In some cases, locality will also be determined in response to data gathered during operation, for example usage statistics accumulated at a metadata service based on reports from memory managers.

As also shown at 142, the cache insertion may also include messaging or otherwise conferring with one or more local memory managers (e.g., memory managers MM1, MM2, etc. of FIG. 1). This communication may include requests, acknowledgments and the like. As an illustration, metadata service 30 might determine, based on usage statistics and certain metadata, to attempt to cache a requested block of data in a memory location managed by memory manager MM4. Metadata service 30 would send the insertion request to memory manager MM4, which could then grant the request and permitted the requested block to be written into its managed memory location 24. The interaction of metadata service 30 and memory manager MM4 can also include receiving an acknowledgment at the metadata service, as shown at 144.

As previously discussed, the memory manager in some cases may deny the insertion request, or may honor the request only after performing an eviction or other operation on its managed memory location(s). Indeed, in some cases, insertion requests will be sent to different memory managers, successively or in parallel, before the appropriate insertion location is determined. In any event, the insertion process will typically also include updating the metadata service data store, as also shown at 144. For example, in the case of a cached file, the data store 80 of metadata service 30 (FIG. 1) may be updated with a hash of the path/filename for the file.

As shown at 146, if the insertion is successful, metadata may be provided to the client and the access and read operations can then proceed (138, 126, 128). On the other hand, failed insertion attempts may result in further attempts (142, 144) and/or in auxiliary access of the requested item (132).

Client Configuration—Libraries, Drivers, Virtual Memory, Page Fault Handling

Figure 6:
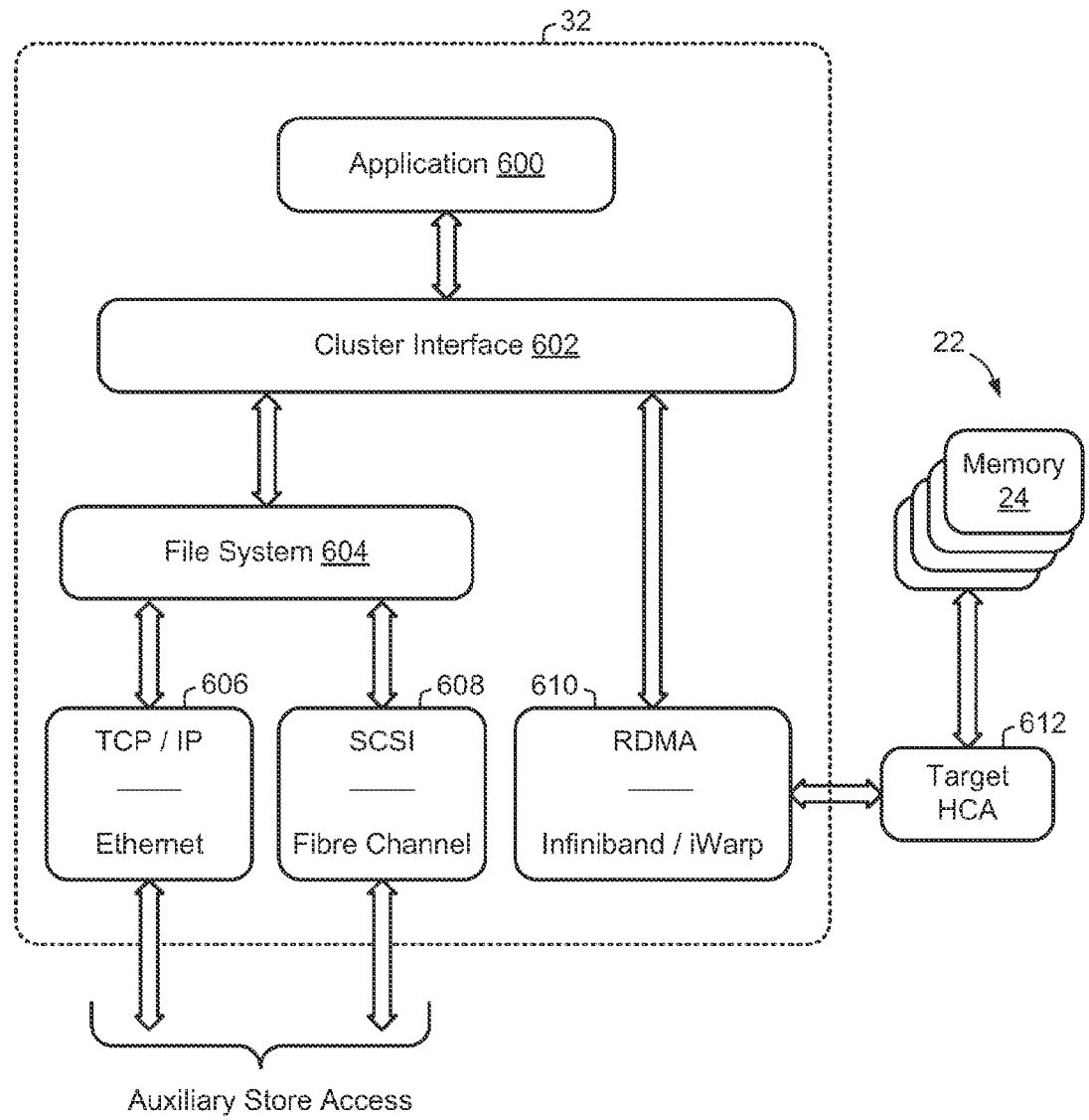
FIGS. 6 and 7 schematically depict example communication stack configurations that may be employed to enable devices to access a distributed shared memory resource.
Figure 7:
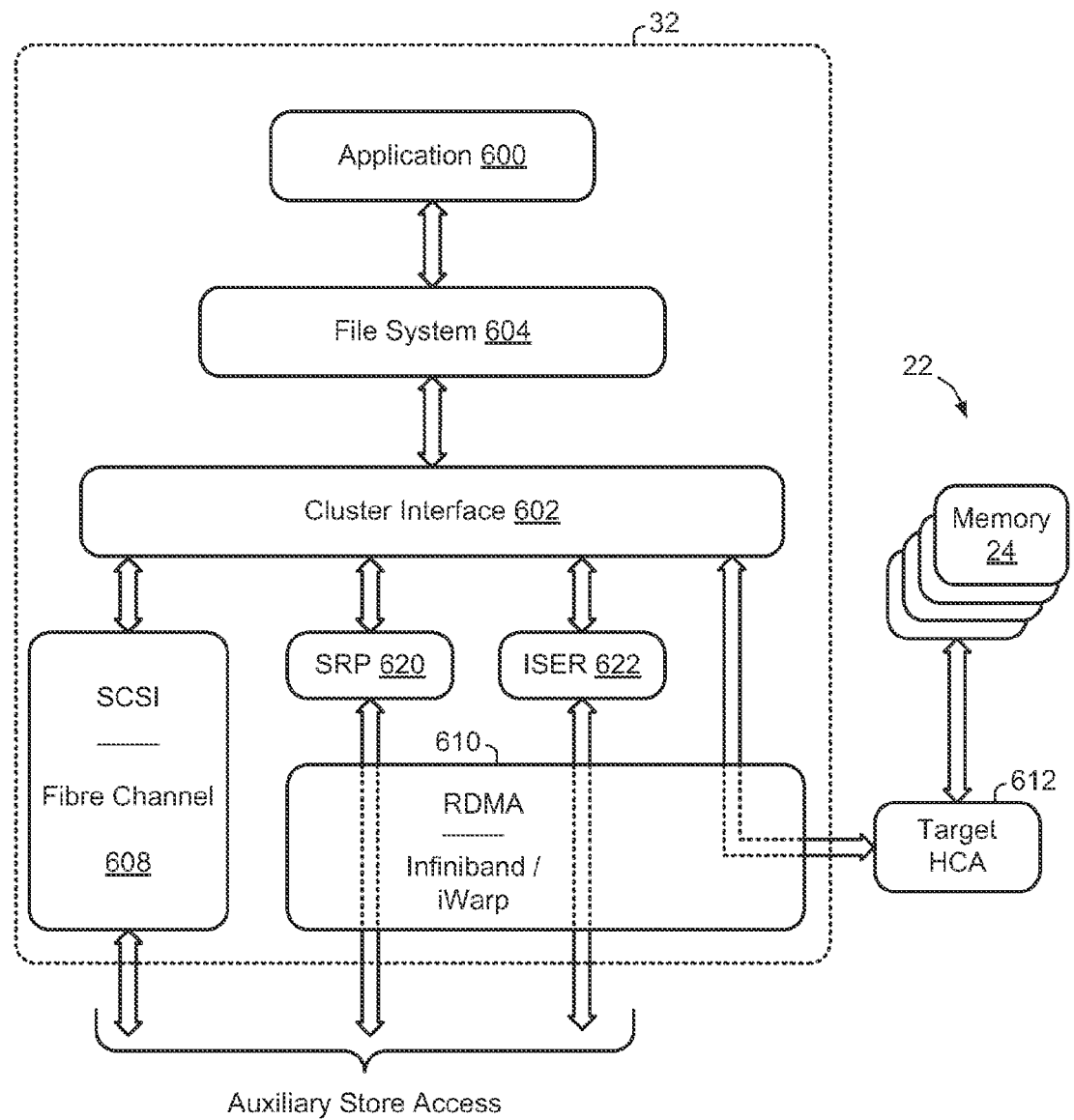

Referring now to FIGS. 6 and 7, the figures depict exemplary architectures that may be employed to provide clients 32 with access to the shared memory resource(s). The figures depict various components of client 32 in terms of a communications stack for accessing data items, and show access pathways for reading data items from an auxiliary store (e.g., auxiliary store 50 of FIG. 1) or from a clustered memory resource (e.g., clustered memory cache 22 of FIG. 1), which typically provides faster and more efficient access than the auxiliary store access.

In the example of FIG. 6, cluster interface 602 is disposed in the communications stack between application 600 and file system abstraction layer 604. Auxiliary store access may be made by the file system layer through known mechanisms such as TCP/IP—Ethernet layers 606, SCSI—Fibre Channel layers 608, and the like. As discussed above, auxiliary store access may occur for a variety of reasons. The file requested by application 600 might be of a type that is not eligible for loading into clustered memory cache. Cluster interface 602 may apply a filter that blocks or prevents access to the shared memory resource, as in step 130 of the exemplary method of FIG. 5. Alternatively, auxiliary store access may be performed after a failed cluster insertion attempt, as shown at steps 146 and 132 of FIG. 5.

Alternatively, cluster interface 602 is configured to bypass file system layer 604 in some cases and read the requested data from a location in the shared memory resource (e.g., a memory location 24 in clustered memory cache 22), instead of from the auxiliary store 50. As indicated, this access of the clustered resource may occur via a client RDMA (over Infiniband/iWarp/RoCE) layer 610 and a target host channel adapter 612.

Cluster interface 602 may perform various functions in connection with the access of the shared memory resource. For example, interface 602 may search for and retrieve metadata in response to a request for a particular file by application 600 (e.g., as in step 124 or steps 134, 136 and 138 of FIG. 5). Interface 602 may also interact with a metadata service to insert a file into the clustered cache, and then, upon successful insertion, retrieve metadata for the file to allow the cluster interface 602 to read the file from the appropriate location in the clustered cache.

In one example embodiment, cluster interface 602 interacts with the virtual memory system of the client device, and employs a page-fault mechanism. Specifically, when a requested item is not present in the local memory of the client device, a virtual memory page fault is generated. Responsive to the issuance of the page fault, cluster interface 602 performs the previously described processing to obtain the requested item from the auxiliary store 50 or the shared memory cluster. Cluster interface 602 may be configured so that, when use of the clustered cache 22 is permitted, item retrieval is attempted by the client simultaneously from auxiliary store 50 and clustered memory cache 22. Alternatively, attempts to access the clustered cache 22 may occur first, with auxiliary access occurring only after a failure.

FIG. 7 alternatively depicts a block-based system, where cluster interface 602 is positioned between the file layer 604 and block-based access mechanisms, such as SCSI—Fibre Channel layer 608 and SRP 620, ISER 622 and RDMA—Infiniband/iWarp (or RoCE) layers 610. In this example, the mechanisms for storing and accessing blocks are consistent with the file-based example of FIG. 6, though the data blocks are referenced from the device with an offset and length instead of via the file path. In particular embodiments, application 600 may be a virtual machine. Additionally, cluster interface 602 may be part of a virtual appliance with which a virtual machine communicates. In particular embodiments, a combination of iSER and RDMA transports may be used (in conjunction with iSER target devices in the virtual machine). In yet other embodiments, a native driver (operable to function with cache cluster 22) may be placed inside a hypervisor itself, and may use the RDMA stack instead of iSER in its data path. In these example embodiments, I/O flows from a virtual machine file system (e.g., 604) to a native driver and then to a local memory manager 34, for example, running inside a virtual machine.

Depending on the particular configuration employed at the client, block-level or file-level invalidation may be employed. For example, in the event that an application is writing to a data item that is cached in the clustered resource, the cached copy is invalidated, and an eviction may be carried out at the local memory/cache manager in the cluster where the item was stored. Along with the eviction, messaging may be sent to clients holding references to the cached item notifying them of the eviction. Depending on the system configuration, the clients may then perform block or file-level invalidation.

Furthermore, it will be appreciated that variable block sizes may be employed in block-based implementations. Specifically, block sizes may be determined in accordance with policy specifications. It is contemplated that block size may have a significant affect on performance in certain settings.

Finally, configurations may be employed using APIs or other mechanisms that are not file or block-based.

Policy Example—Cache Data Replication

In particular embodiments, clustered memory cache 22 may include cache data replication functionality. This cache data replication functionality may be managed by configuration manager 42, metadata service 30, local memory managers 34, or any combination of these elements of network 20. In an embodiment including the cache data replication functionality, physical memory 24 may include data representing a portion of clustered memory cache 22 as well as one or more replica stores of data representing another portion or portions of clustered memory cache 22, with both the data and the replica stores managed by local memory manager 34. In particular embodiments, the replica stores of clustered memory cache 22 may not be directly accessible to client 32. In such an embodiment, the replica stores may be used for improved fault tolerance. As an example, with reference to FIG. 1, computing system 1 includes local memory manager MM1. The physical memory 24 associated with and managed by MM1 may include both data representing a portion of clustered memory cache 22, as well as a replica store of data representing the portion of clustered memory cache 22 associated with local memory manager MM2.

This type of cache data replication functionality may prevent the loss of data written to clustered memory cache 22. Such a loss may be caused by a failure between the time a write to the clustered memory cache 22 completes and the time this written data is flushed from the cache to a backing store, such as auxiliary store 50. Types of failure may include, for example, failure of a portion of physical memory 24, failure of a local memory manager 34, or failure of a computing system.

In particular embodiments, physical memory 24 may include multiple cache blocks. Each of these cache blocks, in turn, may include multiple disk blocks; as an example (and without limitation), each cache block may include between 32 and 256 disk blocks. In particular embodiments, clustered cache 22 may replicate only "dirty" cache blocks (e.g., cache blocks with write data that has not yet been flushed to auxiliary store 50). Data replication of cache blocks (e.g., dirty cache blocks) within cache 22 may be accomplished generally by the following steps. First, when a write to cache 22 occurs, the write data is written to some unit of physical memory 24, e.g. a cache block within memory 24, managed by a local memory manager 34. The write data is logically copied from its cache block to some number (one or more) of replica cache blocks in a different physical memory unit 24 managed by a different local memory manager 34. Once the data is written both to its original destination cache block and to any and all replica cache blocks, the write is completed (e.g., completed back to client 32). In embodiments in which only "dirty" cache blocks are replicated, the write may be completed (e.g., back to client 32) before the data of the cache block is written to auxiliary store 50, as long as replica cache blocks have been created and written. Thus, if a cache block (or larger portion of physical memory 24) later fails, the clustered cache 22 may switch to using the replica for the failed portion of cache 22 and resume operation. As described earlier, in particular embodiments, the replica cache blocks may not be accessible to a client 32 in the manner that the cache blocks may be accessible to the client.

In the example embodiment of each physical memory 24 having exactly one associated replica store, the replica store may be located in a different physical memory 24 (managed by a different local memory manager 34). Thus, in the example of FIG. 1, if physical memory 24 located on computing system 1 (and managed by MM1) has exactly one replica store for its cache blocks, for example on physical memory 24 located on computing system 4 (and managed by MM4), both the physical memory on computing system 1 and the physical memory on computing system 4 would have to fail or be inaccessible for the relevant cache blocks to become unavailable to clustered memory cache 22. By placing the replica store in a different physical memory 24, fault tolerance for the system may be increased. In particular embodiments, if physical memory 24 (managed, for example by MM1) includes multiple distinct memory units, each unit having exactly one replica, the replicas of all of these memory units will be managed by a single local memory manager (for example, MM4). In yet other embodiments, each physical memory 24 may have more than one replica store, such that each replica store for the cache blocks of a particular physical memory 24 is physically distinct from and managed by a different local memory manager than the other replica stores. This may reduce exposure to failure of physical memory 24, failure of a local memory manager 34, or failure of a computing system. In particular embodiments in which each physical memory 24 has multiple replica stores, the location of each replica store may be chosen using a circular scheme; these embodiments may require that there is an ordered list of local memory managers 34. As an example, each of a local memory manager's physical memory units may have their N replica stores hosted sequentially by physical memory units managed by the next N local memory managers. This disclosure contemplates any suitable manner of locating replica stores in clustered cache 22.

The assignment of a replica store for a set of cache blocks (or other portion of physical memory 24) may occur or change upon a variety of conditions within clustered memory cache 22. As an example, when membership in cache 22 changes, a new replica store may be created or an existing replica store may change ownership. If, for example, a computing system 26 or memory 24 joins clustered cache 22, a new replica store may be created for the corresponding new cache blocks. Similarly, if a computing system 26 or memory 24 fails (or is automatically or manually reconfigured), an existing replica store (associated with the failing unit) may be absorbed as a fully functional part of clustered memory cache 22 and a new replica store may then be created. Additionally, if a new local memory manager 34 is associated with cache 22 or if an existing memory manager 34 fails or otherwise is disassociated with cache 22, a new replica store may be created or an existing replica store may be changed.

Each replica store may include one or more replica blocks, with each replica block in a replica store corresponding to a cache block in a primary store (i.e., the portion of clustered cache 22 that the replica store is replicating). In particular embodiments, a replica block is created when the primary cache block becomes writeable. As an example, the primary cache block may contain data that was previously read in from auxiliary store 50 for client 32. If client 32 subsequently issues a write command to the primary block, a replica block should be created. The client will not be able to proceed with this write to the primary block before the replica block is allocated. The replica block may be allocated by the local memory manager 34 that manages the primary block. In other embodiments, the replica block may be allocated by the local memory manager 34 that manages the replica store that will contain the replica block. Once the replica block is allocated, the client obtains a write reference and may proceed in writing to the primary block. As the client writes to the primary block, the replica block is populated with the data written by the client. The management of the writes to the replica block may be done by the local memory manager 34 that manages the primary block. The writes to a primary block and its replica block may, in certain embodiments, be dispatched by the local memory manger 34 proximately in time to reduce latency in completing a write back to a client 32, for example. Additionally, in particular embodiments, a local memory manger 34 may keep records of pending write operations to primary blocks in its associated memory 24 and to the primary blocks' replica blocks; these records may be stored in cache store 60 and may allow for recovery in case a connection to the replica store or stores for memory 24 are lost.

In particular embodiments, a replica block may be released when its corresponding primary block contains no "dirty" or unflushed data and when no client 32 holds a write reference to the primary block. The local memory manager 34 managing the primary block may then de-allocate or free the replica block of the replica store (either directly or in communication with the local memory manager 34 managing the replica store). In other embodiments, a replica block may be released when the primary block contains no dirty or unflushed data even if a client 32 still holds a write reference to the primary block.

In embodiments of clustered cache 22 including cache data replication functionality, client 32 is not required to issue a flush command on dirty cache blocks in order to prevent data loss, since each dirty cache block is replicated elsewhere in clustered cache 22. However, it may still be desirable in particular embodiments for client 32 to retain write references to and maintain a list of its least recently used cache blocks to allow a local memory manager 34 to flush the least recently used dirty cache blocks to a backing store (e.g., auxiliary store 50), ask for release of the client's write references to those blocks, and free the replicas of those blocks.

Policy Example—Cache Solvency

In particular embodiments of clustered cache 22, a solvency policy is applied. Maintaining cache solvency, generally, refers to maintaining a portion of the cache that has no client 32 references to it and that contains no dirty data. The cache blocks (or other units of memory 24) in cache 22 that satisfy these requirements may be referred to as the cache solvency pool. As an example implementation of a cache solvency policy, a cache solvency pool may be maintained by enforcing a budget for dirty data blocks and a budget of cache references that any client 32 may have at a given time for the portion of cache 22 managed by a particular local memory manager 34. These budgets for dirty data and location references may be communicated to each client by the particular local memory manager. The budgets may change at any time; for example, if the size of the memory 24 changes or if another client 32 connects to local memory manger 34. The local memory manager limits for dirty data and outstanding references may be divided among its clients. As an example, if local memory manager 34 has a hard dirty data budget of 50% (i.e., up to 50% of the data in its associated memory 24 may be dirty at a given time), and it has 5 clients 32 associated with it, then the memory manager may communicate a dirty data budget of 10% (of the total memory 24) to each of the five clients 32. In this example, if any client exceeds dirty data limit of 10%, local memory manager 34 may communicate to that client that it should attempt to flush some of its existing dirty data. If, in this same example, any client hits the hard total dirty data budget of 50%, local memory manager may communicate to this client that it may no longer write to memory 24. As another example, if local memory manager 34 has exceeded its accessible data or outstanding reference budget by 80 megabytes, and if it has 10 clients 32, local memory manager 34 may communicate to each of the 10 clients that it would like each of them to release 8 megabytes worth of their data references to memory 24. In this embodiment of the cache cluster 22 with cache solvency policy, it is up to each client 32 to tell local memory manager 34 when it may flush dirty data written by the client or when it may release references held by the client. As such, when the local memory manager 34 makes a request to a client, it is up to the client when the client will comply. In the example in which memory manager 34 requests each client to release 8 megabytes worth of data, it may be the case that certain clients comply immediately while others do not. Memory manager 34 may then reassess how much more data should be released in order to maintain its cache solvency. Once it has determined what that new number is (for example, 40 megabytes), memory manager 34 may again request each of its clients to release some fraction of this new amount (for example, 4 megabytes from each of 10 clients). This process of requesting the release of references and recalculating how much more is needed for solvency may repeat until memory manager 34 has achieved its solvency goals (as defined by its budgets). In particular implementations, local memory manager 34 may keep track (e.g. in cache store 60) of which clients it has made release requests of and how much has been released by each client. Clients may choose which references to release based on which references are for the least-recently-used cache blocks, as described above. It should be noted that, in certain implementations of this cache solvency policy, in order for local memory manager 34 to regain a cache block, all clients 32 with references to that cache block should release their references, and any dirty data for that block should first be flushed (before it may be released).

In a second example embodiment of clustered cache 22 utilizing a cache solvency policy, the local memory manager 34 is charged with flushing dirty data bits to auxiliary store 50 and with managing the amount of accessible data in memory 24 (e.g., the amount of data with outstanding references). In this implementation, there is an implicit hard limit on the amount of accessible data in that when memory 24 is full, no more references are available, and local memory manager 34 performs write-through or read-through functions. Like the first example embodiment of a cache solvency policy, local memory manager 34 may determine how much data needs to be "given up" (how many references need to be released) by clients 32 and may request each of these clients iteratively to release some fraction of the global amount. When clients 32 release data references to cache blocks with dirty bits on them, the local memory manager 34 may flush the dirty bits, as it is in charge of flushing in this implementation. As an example, local memory manager 34 may maintain a pipeline of in-flight I/O that may be flushed when it desires (e.g., in cache store 60). Local memory manager 34 may also maintain a flush queue for the least-recently-used cache blocks having dirty bits to determine which blocks to flush first. In particular embodiments, the flush queue managed by local memory manager 34 may keep track (for each cache block) when the cache block became dirty. If a cache block has been dirty for a certain amount of time, it may be moved to the front of the flush queue. In other embodiments, the flush queue may operate in a background fashion, in an opportunistic fashion (e.g., flush when there are no write references to a cache block having dirty data bits), or any other suitable manner.

Policy Example—Thin Write-Back Cache

If the first access by client 32 to an element in auxiliary store 50 is a write, then in a traditional write-back cache, a read from auxiliary store 50 would first occur, creating a cache block in clustered memory cache 22. The cache block would then be written to by client 32. In particular embodiments, clustered memory cache 22 may employ a thin write-back cache strategy that may avoid requiring that a read from auxiliary store 50 first occur before a client 32 may write to cache 22. In one implementation, when a client 32 indicates that they would like to write to cache 22, the client 32 is allowed (managed, e.g. by local memory managers 34) to directly write to an entry in cache 22. That is, the cache block is allocated but data is not read in from auxiliary store 50; the client 32 writes to the allocated cache block. The local memory manager for the memory 24 in which cache block resides will maintain a mapping of all sectors (units of memory 24 that are smaller than a cache block) of all its cache blocks, e.g. in cache store 60. The mapping of the sectors will contain information about which sectors are "dirty"—e.g., which sectors have been written to but have not been flushed to auxiliary store 50. In one example sector map, the map is 64 bits, each bit corresponding to one of 64 sectors of a cache block; if the bit is a "1" then the corresponding sector may be "dirty," and if the bit is a "0", then the corresponding sector may be "clean." If, at any point during its lifetime after being written, the cache block is read in from auxiliary store 50, only a partial read will be done. That is, only the non-dirty sectors of the cache block will be read in from auxiliary store 50. If, instead, before the cache block is ever read, it must be expired, only a partial write will be done. That is, only the dirty sectors of the cache block will be flushed from the cache block to the auxiliary store (as the other sectors of the cache block have not been written, nor do they contain any data read-in from auxiliary store). In addition to a dirty-sector mapping, the local memory manager 34 may also maintain a separate valid-sector mapping. The valid-sector mapping indicates which of the sectors of the cache block are valid or up-to-date (e.g., for reading by client 32). If, for example, after being written, a partial read is done to the cache block from auxiliary store 50, those sectors read in from auxiliary store 50 will be considered valid and marked as such in the valid-sector mapping (e.g., using a 64-bit mapping similar to the dirty-sector mapping). Generally speaking, a sector may be considered valid if it is up-to-date. That is, if a sector is dirty, then the sector may also be valid (because it is up-to-date and valid for reading by a client even though the data has not yet been flushed to the auxiliary store 50). Post-flush, there may be no dirty sectors in a cache block, but the previously-dirty sectors (which are as-yet untouched by client 32) are still valid sectors. The management of the sector maps may be done by local memory manager 34, either with or without knowledge (or assistance provided) by client 32. In particular implementations, once an entire cache block is considered "valid" in the valid-sector map, then a flag may be set, and client 32 may directly access this block in cache 22 for a read without having to interact first with local memory manager 34.

CONCLUSION

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDD5), hybrid hard drives (HHD5), optical discs, optical disc drives (ODDs), magneto-optical discs, magneto-optical drives, floppy diskettes, floppy disk drives (FDD5), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:
1. A method comprising:
receiving, at a computing device, a request to write data to a portion of a cache, the computing device comprising a memory, the computing device further comprising a cache manager;
writing the data to the portion of the cache;
updating, at the cache manager, a first map corresponding to the portion of the cache, wherein the first map comprises a set of bits, each bit corresponding to a subset of the portion of the cache, and wherein each bit in the first map indicates whether data in the corresponding subset of the portion of the cache has been written to a storage;
receiving a request to read data from the portion of the cache;
reading from the storage communicatively linked to the computing device data according to the first map, wherein reading from the storage data according to the first map comprises reading from the storage data corresponding to the subsets of the portion of the cache that, according to the first map, do not include data that has not been written to the storage;
updating, at the cache manager, a second map corresponding to the portion of the cache.

2. The method of claim 1, further comprising writing data to the storage according to the first map.

3. The method of claim 1, wherein the second map for the portion of the cache comprises a set of bits, each bit corresponding to a subset of the portion of the cache.

4. The method of claim 3, wherein each bit in the second map indicates whether data in the corresponding subset of the portion of the cache is valid for reading.

5. One or more computer-readable non-transitory storage media embodying logic that is operable when executed to:
receive, at a computing device comprising the media, a request to write data to a first portion of a cache, the computing device further comprising a memory and a cache manager;
write the data to the first portion of the cache;
update, at the cache manager, a first map corresponding to the first portion of the cache, wherein the first map comprises a set of bits, each bit corresponding to a subset of the portion of the cache, and wherein each bit in the first map indicates whether data in the corresponding subset of the portion of the cache has been written to a storage;

receive a request to read data from the first portion of the cache;

read from the storage communicatively linked to the computing device data according to the first map, wherein reading from the storage data according to the first map comprises reading from the storage data corresponding to the subsets of the portion of the cache that, according to the first map, do not include data that has not been written to the storage;

update, at the cache manager, a second map corresponding to the first portion of the cache.

6. The media of claim 5, wherein the logic is further operable when executed to write data to the storage according to the first map.

7. The media of claim 5, wherein the second map for the first portion of the cache comprises a set of bits, each bit corresponding to a subset of the first portion of the cache.

8. The media of claim 7, wherein each bit in the second map indicates whether data in the corresponding subset of the first portion of the cache is valid for reading.

9. A computing system, comprising:
a cache comprising one or more memories; and
a cache manager;
wherein the cache manager is operable to:
receive a request to write data to a first portion of the cache;
write the data to the first portion of the cache;
update, at the cache manager, a first map corresponding to the first portion of the cache, wherein the first map comprises a set of bits, each bit corresponding to a subset of the first portion of the cache, and wherein each bit in the first map indicates whether data in the corresponding subset of the first portion of the cache has been written to a storage;

receive a request to read data from the first portion of the cache;

read from the storage communicatively linked to the computing system data according to the first map, wherein reading from the storage data according to the first map comprises reading from the storage data corresponding to the subsets of the first portion of the cache that, according to the first map, do not include data that has not been written to the storage;

update, at the cache manager, a second map corresponding to the first portion of the cache.

10. The computing system of claim 9, wherein the cache manager is further operable to write data to the storage according to the first map.

11. The computing system of claim 9, wherein the second map for the first portion of the cache comprises a set of bits, each bit corresponding to a subset of the first portion of the cache.

12. The computing system of claim 11, wherein each bit in the second map indicates whether data in the corresponding subset of the first portion of the cache is valid for reading.

13. The computing system of claim 9, wherein the request to write data to a first portion of a cache is from a client communicatively linked to the computing system.

14. The computing system of claim 9, wherein the first portion of the cache comprises a cache block.

* * * * *